(12) United States Patent
Roberts

(10) Patent No.: US 9,456,619 B1
(45) Date of Patent: Oct. 4, 2016

(54) CONTROL OF CALORIC INTAKE

(76) Inventor: Seth D. Roberts, Berkeley, CA (US)

(\*) Notice: Subject to any disclaimer, the term of this patent is extended or adjusted under 35 U.S.C. 154(b) by 1943 days.

(21) Appl. No.: 11/209,260

(22) Filed: Aug. 22, 2005

Related U.S. Application Data

(63) Continuation of application No. 09/967,235, filed on Sep. 27, 2001, now abandoned.

(60) Provisional application No. 60/236,042, filed on Sep. 27, 2000.

(51) Int. Cl.
  *A23D 9/00* (2006.01)
  *A23L 1/29* (2006.01)
  *A23D 9/02* (2006.01)

(52) U.S. Cl.
  CPC ............... *A23D 9/00* (2013.01); *A23L 1/293* (2013.01); *A23D 9/02* (2013.01)

(58) Field of Classification Search
  CPC ........... A61K 2300/00; A61K 31/201; A23V 2002/00; A23V 2200/332; A23V 2250/1882; A23V 2250/1868; A23V 2250/188; A23V 2250/18; A23V 2250/1872; A23V 2250/1942; A23V 2250/1944; A23V 2250/1946; A23V 2250/21
  See application file for complete search history.

(56) References Cited

U.S. PATENT DOCUMENTS 5,484,623 A    1/1996 McLean
5,855,949 A *  1/1999 McLean ..................... 424/765

OTHER PUBLICATIONS

"Effects of Weight and Energy Content of Preloads on Subsequent appetite and Food Intake" by Graaf et al., appetite, 1996, 26, 139-151.*
Andi, "Are You Drinking Enough Water?" (excerpts from a purported 1997 magazine article), web page published on the Internet by at least Feb. 29, 2000, USA; www.freeweightloss.com/article9.html.
Brand-Miller et al., The Glucose Revolution: The Authoritative Guide to The Glycemic Index, the Groundbreaking Medical Discovery, 1999, pp. 59-69, Marlow & Co., New York, USA.
Cabanac, "Regulation and the ponderostat," International Journal of Obesity, 2001, Suppl. 5, pp. S7-S12, vol. 25, Nature Publishing Group, United Kingdom.
Cabanac, "Open Loop Methods for Studying the Ponderostat," Chemical Senses, vol. 4: Appetite and Nutrition, 1991, pp. 149-170, Marcel Dekker, Inc., New York, USA.
Cabanac et al., "Influence of a Monotonous Food on Body Weight Regulation in Humans," Physiology & Behavior, 1976, pp. 675-678, vol. 17, Pergamon Press & Brain Research Publications, USA.

(Continued)

*Primary Examiner* — Isis Ghali
(74) *Attorney, Agent, or Firm* — Gary Peterson

(57) ABSTRACT

A method for reducing human or animal weight from body fat, comprising providing a caloric source having a mild flavor or less flavor, other than sweetness or saltiness, at a time different from meal time and in an amount sufficient to provide a significant fraction of total daily caloric consumption, while eating normal food at meal times.

2 Claims, 11 Drawing Sheets

(56) References Cited

OTHER PUBLICATIONS

Cabanac et al, "Evidence that transient nicotine lowers the body weight set point," Physiology & Behavior, 2002, pp. 539-542, vol. 76, Elsevier Science Inc., USA.
Diamond et al., Fit for Life, 1985, pp. 32-53, 60-69, Warner Books, New York, USA.
Epstein et al., "Aerobic Exercise and Weight," Addictive Behaviors, 1980, pp. 371-388, vol. 5, Pergamon Press Ltd., USA.
Gibbs, "Gaining on Fat," Jan. 2004 (originally published Aug. 1996), Scientific American Online Issue, pp. 31-36, USA.
Herbert, "Experimental Nutritional Folate Deficiency in Man," 1962, pp. 307-320, vol. 75, Transactions of the Association of American Physicians, USA.
Hirsch et al., "Diet composition and energy balance in humans," American Journal of Clinical Nutrition, 1998, pp. 551S-555S, vol. 67, American Society for Clinical Nutrition, USA.
Iknoian, "Sports Drinks: Do I need 'em?," web page published on the Internet by at least Dec. 20, 2003, USA www.totalfitnessnetwork.com/cgi-bin/totalfitnessnetwork/Sports_Drinks.html.
Intersalt Cooperative Research Group, "Intersalt: an international study of electrolyte excretion and blood pressure. Results from 24 hour urinary sodium and potassium excretion," British Medical Journal, 1988, pp. 319-328, vol. 297, British Medical Association, London, United Kingdom.
Keesey et al., "Body Weight Set-Points: Determination and Adjustment," Obesity: Common Setpoint of Diverse Gene-Based Metabolic Regulations, 1997, pp. 1875S-1883S, American Society for Nutritional Sciences, USA.
Kleiner, "Water: An essential but overlooked nutrient," Journal of the American Dietetic Association, Feb. 1999, pp. 200-206, vol. 99, USA.
Ludwig et al., "Dietary Fiber, Weight Gain, and Cardiovascular Disease Risk Factors in Young Adults," 1999, Journal of American Medical Association, Oct. 27, 1999, pp. 1539-1546, vol. 282, American Medical Association, USA.
Montignac, Eat Yourself Slim, 1999, pp. 49-65, Erica House, Baltimore, USA.
O'Dea, "Marked Improvement in Carbohydrate and Lipid Metabolism in Diabetic Australian Aborigines After Temporary Reversion to Traditional Lifestyle," Diabetes. Jun. 1984, pp. 596-603, vol. 33, American Diabetes Association, New York, USA.
Ramirez, "Overeating, Overweight and Obesity Induced by an Unpreferred Diet," Physiology & Behavior, 1988, pp. 501-506, vol. 43, Pergamon Press plc, USA.
Ramirez, "Stimulation of Energy Intake and Growth by Saccharin in Rats," Journal of Nutrition, 1990, vol. 120, pp. 123-133, American Institute of Nutrition, USA.
Ramirez, "Feeding a Liquid Diet Increases Energy Intake, Weight Gain and Body Fat in Rats," Journal of Nutrition, 1987, vol. 117, pp. 2127-2134, American Institute of Nutrition, USA.
Roberts et al., "Self Experimentation," Lattal et al., Handbook of Research Methods in Human Operant Behavior, 1988, pp. 1-50, Plenum Press, New York, USA.
Schwartz et al., "Model for the regulation of energy balance and adiposity by the central nervous system," American Journal of Clinical Nutrition, 1999, pp. 584-596, vol. 69, American Society for Clinical Nutrition, USA.
Sclafani, "Conditioned food preferences," Bulletin of Psychonomic Society, 1991, pp. 256-260, vol. 29, USA.
Sclafani, "Learned Controls of Ingestive Behavior," Appetite, 1997, pp. 153-158. vol. 29, Academic Press Limited, USA.
Sclafani et al., "Dietary Obesity in Adult Rats: Similarities to Hypothalamic and Human Obesity Syndromes," Physiology & Behavior, 1976, pp. 461-471, vol. 17, Pergamon Press & Brain Research Publications, USA.
Sears et al., The Zone: A Dietary Road Map, 1995, pp. 9-23, 65-67, ReganBooks, USA.
Shintani et al., "Obesity and cardiovascular risk intervention through the ad libitum feeding of traditional Hawaiian diet," American Journal of Clinical Nutrition, 1991, pp. 1647S-1651S, vol. 53, American Society for Clinical Nutrition, USA.
The Gatorade Company, "Ranking the Sports Drinks" (purported 1997 copyright date), web page published on the Internet by at least Aug. 12, 2002, USA, www.dietsite.com/SportsNutrition/Ranking%20the%20Sports%20Drinks.html.
Fantino, "Effet de l'alimentation intra-gastrique au long cours chez l'Homme," 1976, Journal de Physiologie, p. 86A, vol. 72, Masson, Paris, France (English translation attached).
Hervey, "Regulation of Energy Balance," Nature, 1969, pp. 629-631, vol. 222, Macmillan Journals Ltd., London, United Kingdom.
McKiernan et al., "Short-Term Dietary Compensation in Free-Living Adults," Physiology & Behavior, 2008, pp. 975-83, vol. 93, Elsevier Inc., Amsterdam, Netherlands.
Rodin et al., "Metabolic Effects of Fructose and Glucose: Implications for Food Intake," American Journal of Clinical Nutrition, 1988, pp. 683-689, vol. 47, American Society for Clinical Nutrition, New York, USA.
Rodin, "Comparative Effects of Fructose, Aspartame, Glucose, and Water Prelaods on Calorie and Macronutrient Intake," American Journal of Clinical Nutrition, 1990, pp. 428-435, vol. 51, American Society for Clinical Nutrition, New York, USA.
Rodin, "Effects of Pure Sugar vs. Mixed Starch Fructose Loads on Food Intake," Appetite, 1991, pp. 213-219, vol. 17, Academic Press Limited, London, United Kingdom.
Spitzer et al., "Effects of Fructose and Glucose Preloads on Subsequent Food Intake," Appetite, 1987, pp. 135-145, vol. 8, Academic Press Inc. (London) Limited, London, United Kingdom.
Guss et al., abstract of "Effects of glucose and fructose solutions on food intake and gastric emptying in nonobese women," American Journal of Physiology—Regulatory, Integrative and Comparative Physiology, 1994, pp. 1537-TR1544, vol. 267, USA. appearing at: http://ajpregu.physiology.org/cgi/content/abstract/267/6/R1537 as of Nov. 9, 2007.
Specialty Coffee Ass'n of America, Brewing Facts web page, at least Sep. 16, 2009, United States, http://members.scaa.org/lounge/CoffeeLoungeDocs/Brewing Facts.aspx.
AO Organic Flaxseed web site, Aug. 29, 2003, Health Centreforce, pp. 1-5.

* cited by examiner

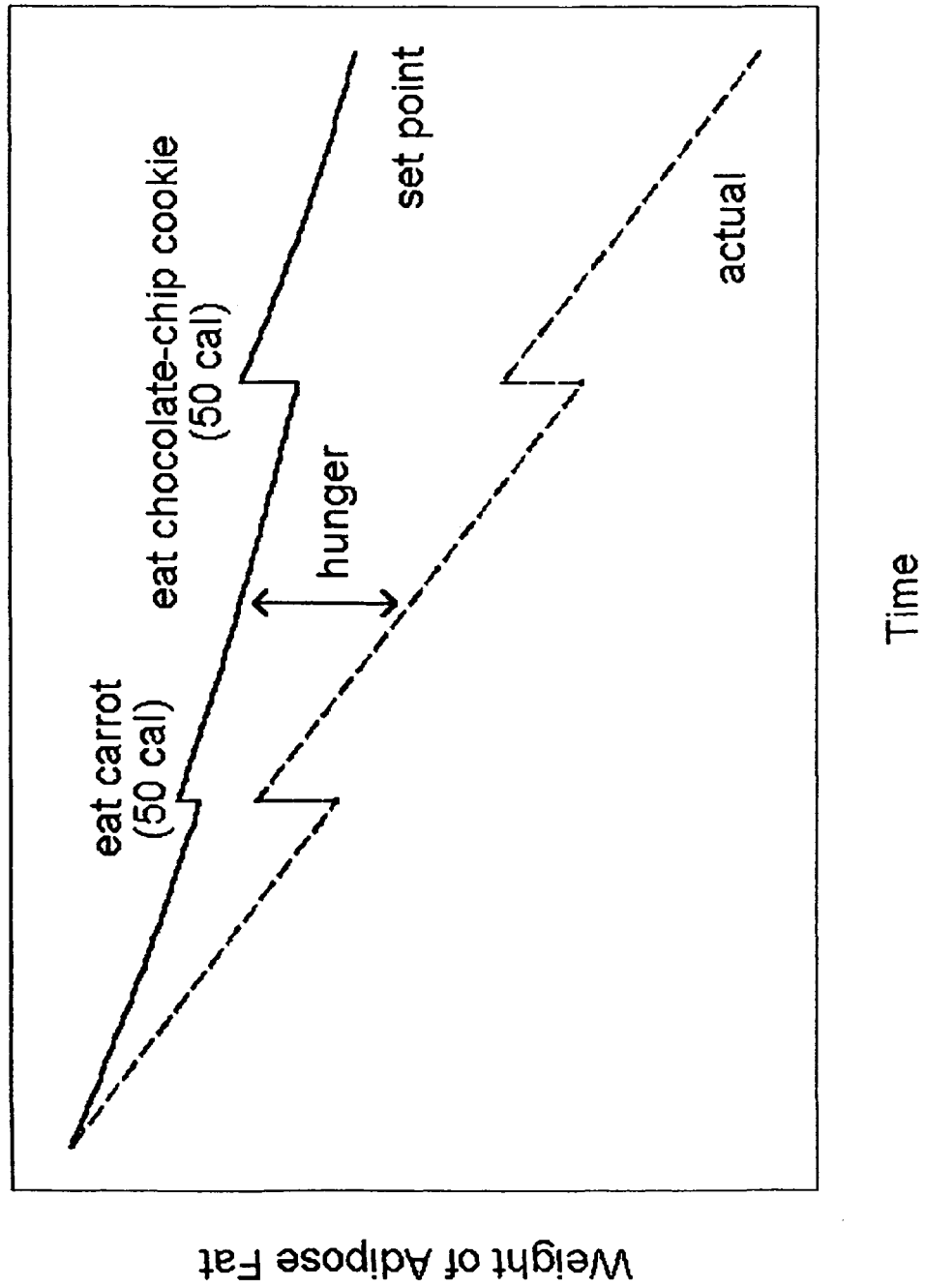

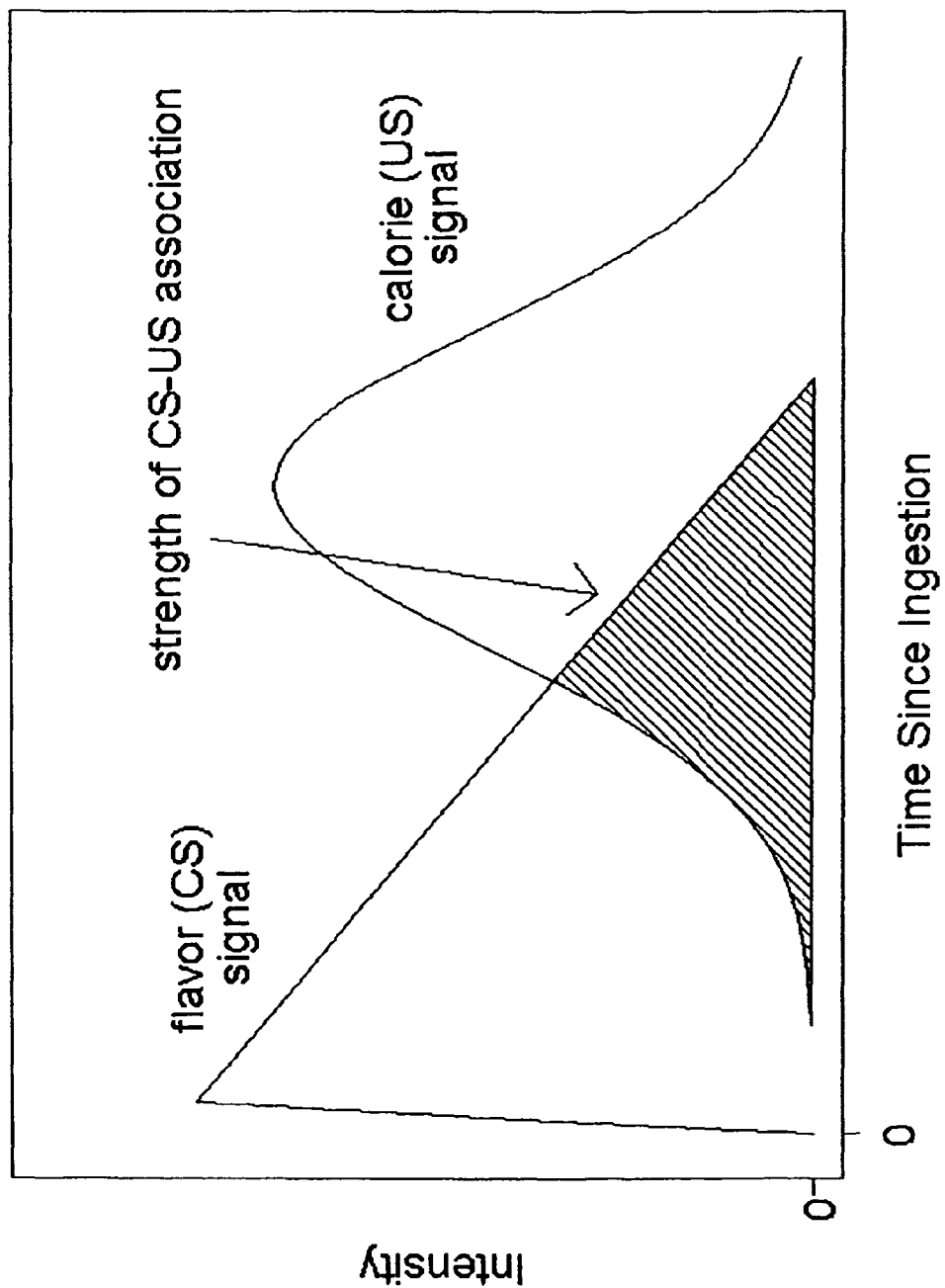

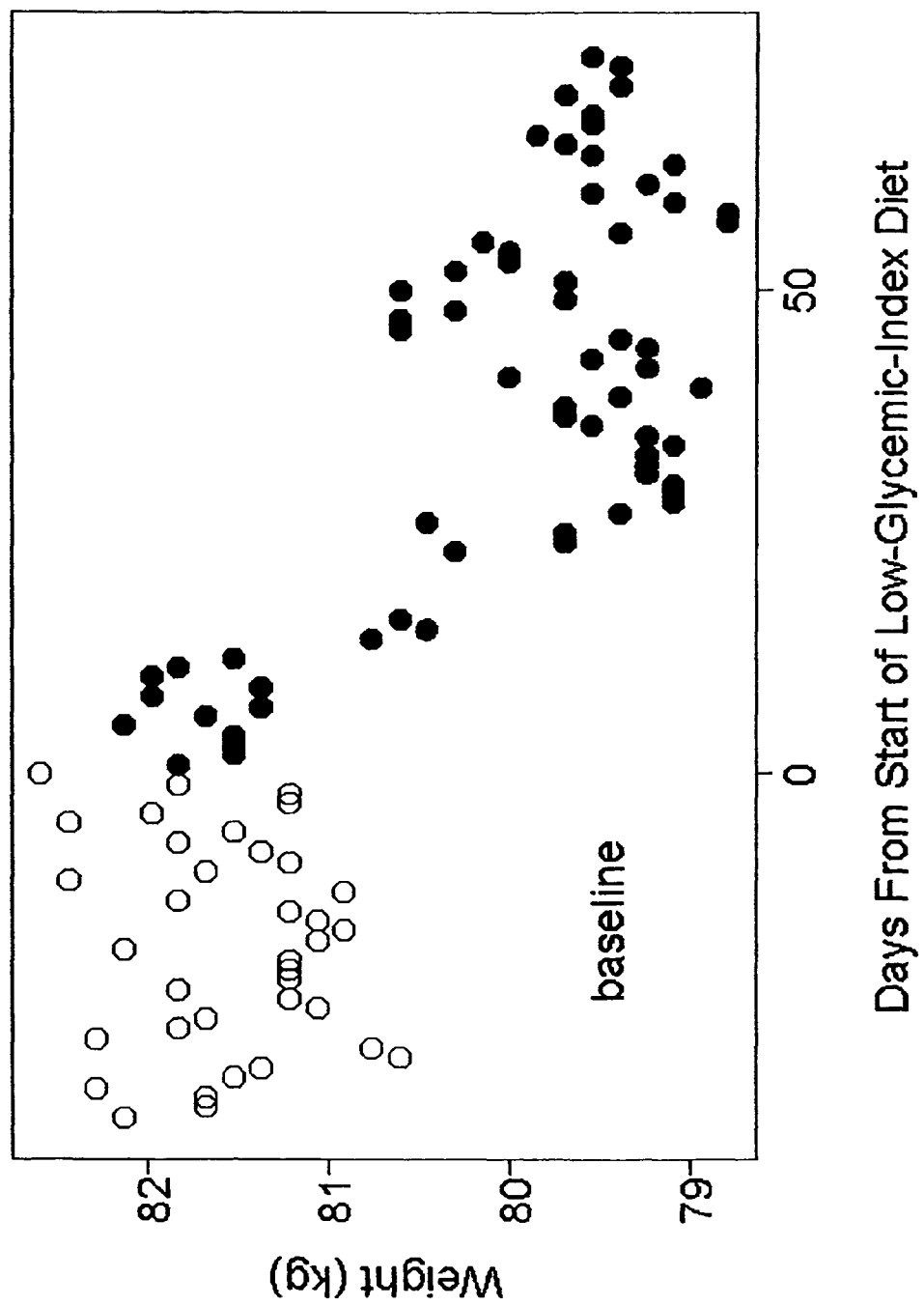

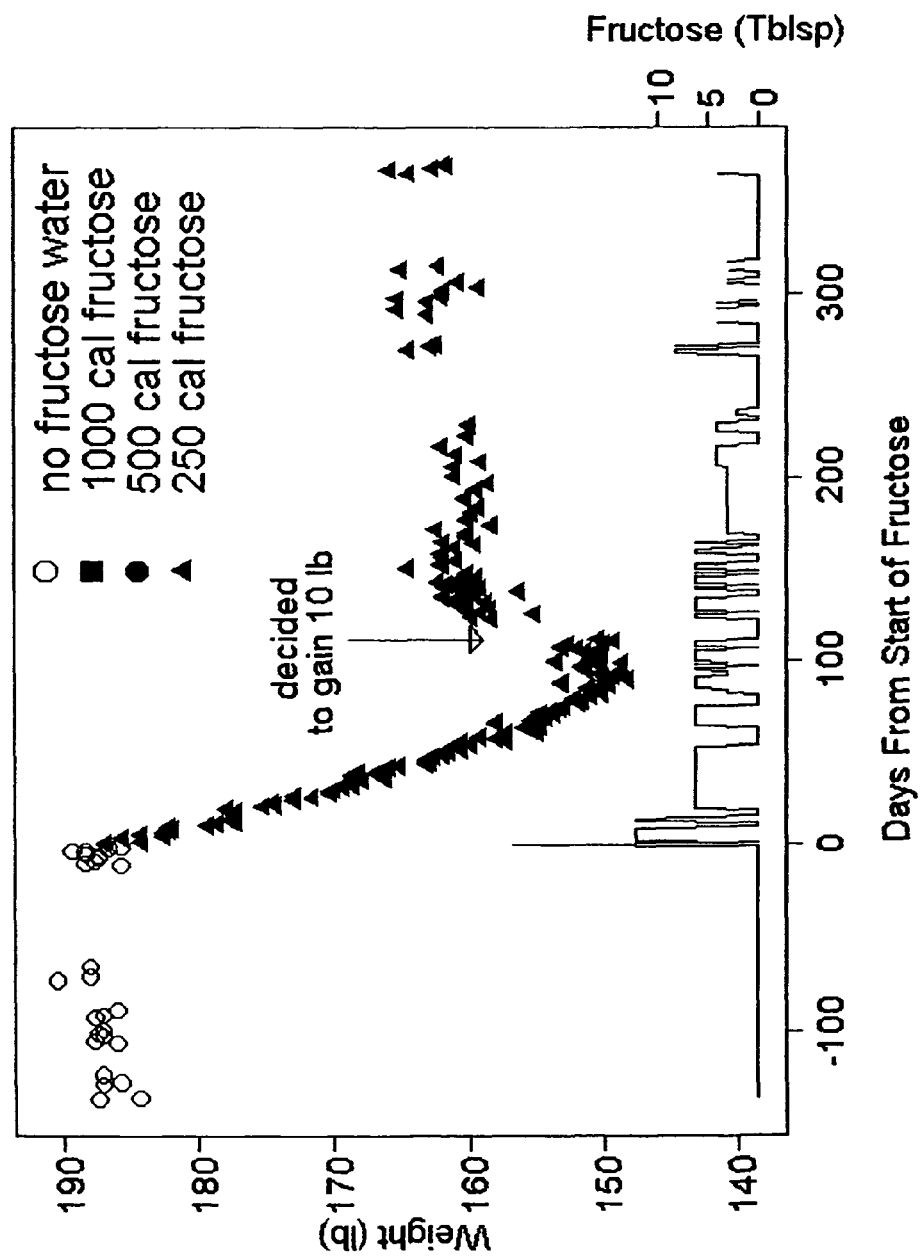

CONTROL OF CALORIC INTAKE

This application is a continuation of U.S. patent application Ser. No. 09/967,235, filed Sep. 27, 2001 now abandoned, which claims priority to U.S. Provisional Patent Application Ser. No. 60/236,042, filed Sep. 27, 2000. The disclosures of these applications are incorporated by reference in their entirety.

BACKGROUND OF THE INVENTION

Many methods have been described that purport to result in loss of weight in humans, specifically in the loss of body fat. However, data to support claims of easily and safely losing large amounts of weight is suspect in many cases, if it even exists. Of methods for which data has been published, five are well known:

(a) Caloric restriction. The person simply consumes fewer calories than usual each day. This can produce substantial weight loss over a few months, but the hunger it causes is intolerable over longer intervals. After a year, a substantial amount of the lost weight is regained and over a five-year period almost all of the lost weight is regained. Nevertheless, this method is still sometimes advocated, such as by Weight Watchers.

(b) Exercise. If a completely sedentary person becomes more active, a substantial amount of weight can be lost with moderate amounts of exercise. For anyone who already does a moderate amount of exercise—and many of these people want to lose more weight—it is very difficult to lose more weight by exercising more.

(c) Reduce fat intake. Reducing the percentage of calories from fat for most people causes only a small loss of weight.

(d) Surgery. In cases of extreme obesity, shortening the intestine causes substantial weight loss. This method, however, is dangerous, so dangerous that it is rarely used.

(e) Drugs. These are dangerous. The latest drug prescribed for weight loss, called fen-phen, was taken off the market after it was discovered to cause heart abnormalities.

Thousands of books have been published advocating methods of losing weight. Almost always there is no data to support the claims. Nevertheless, there may well be something to one method—eating a low-glycemic-index diet—advocated by three recent books, *The Zone* (Sears, 1995), *Eat Yourself Slim* (Montignac, 1999), and *Sugar Busters* (Steward, Bethea, Andrews, & Balart, 1998). (The glycemic index is a measure of how fast carbohydrates are digested. A low-glycemic-index diet emphasizes carbohydrates that are digested slowly, such as legumes. Examples of legumes are beans and lentils.) A large survey (Ludwig et al., 1999) found that people who ate a lot of fiber (highest quintile of fiber intake) weighed about 8 lb. less than people who ate little fiber (lowest quintile of fiber intake). Fiber intake and glycemic index are closely connected—foods with more fiber have lower glycemic indices. As part of testing the theory that led to the invention described here, I tried eating a low-glycemic-index diet and lost 6 lbs. So it is likely that a low-glycemic-index diet can produce a moderate weight loss in many people.

In view of the difficulty in obtaining and sustaining weight loss in individuals, new techniques that provide for weight loss and that are supported by scientifically valid evidence are greatly desired. The method of the invention provides an easy way to lose a large amount of weight (specifically body fat). It does not require going hungry, exercise, surgery, drugs, elimination of any specific food type from the diet, or ingestion of anything unpleasant or unusual. It can be used to maintain a lower weight indefinitely. Current methods of losing large amounts of weight are much more difficult, and the most common methods—eating less and exercise—can rarely be used to lose a large amount of weight for a long period of time.

SUMMARY OF THE INVENTION

To use the method of the invention, a person who wants to lose weight (specifically body fat) consumes a caloric source (solid or liquid) containing calories but with only a mild or weaker flavor (apart from sweetness and/or saltiness) at a time different from meal times. The caloric source contains a substantial number of calories each day (e.g., 20% of the usual daily intake of calories). This will allow the person to greatly reduce caloric intake from his or her usual sources of calories without discomfort—that is, without becoming hungry. He or she should reduce caloric intake from usual sources by more calories than the added calories provided by the unflavored caloric source and will find that elimination of these extra calories is facilitated by the consumption of the unflavored caloric source. When the desired weight is reached, the person should increase consumption of his or her usual sources of calories until weight is no longer being lost. The consumption of the unflavored caloric source between meals should continue (adjusted in amount, if necessary) to maintain the new, lower weight. The amount of calories of the unflavored caloric source taken between meals may need to be increased or decreased to comfortably maintain the new weight.

Any caloric material and specifically and preferably any sugar (e.g., fructose, sucrose, glucose, maltose, etc.) can be used, but fructose is the best choice. Sugars can easily be prepared and ingested in the form of caloric water (i.e., a source of calories dissolved in water). The caloric source can have added vitamins, minerals, fat, protein, or fiber so long as the additions do not produce a strong flavor (with the exception that saltiness and/or sweetness is permitted).

BRIEF DESCRIPTION OF THE DRAWINGS

FIG. 1 shows schematically the set point and an actual weight of adipose fat over time for an individual.

FIG. 2 shows schematically the intensity of flavor and calorie signals for an individual, measured over time since ingestion of food.

FIG. 6 is a graph showing body weight for a single individual over time. The individual's diet changed from a baseline diet to a diet of low-glycemic-index food on day 0.

FIG. 10 is a graph showing body weight for a single individual over time. Fructose consumption began at day 0. The amount of daily fructose consumption over time is shown on a second axis.

DETAILED DESCRIPTION OF INVENTION

Figure 3A:
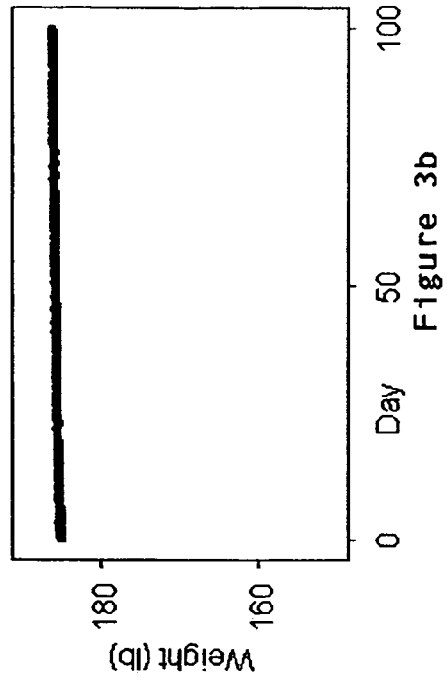
FIG. 3a is a graph showing the results of a computer simulation of the set point and weight for an individual over time. No fructose water is being ingested. The time covered by the Figure is three days.
Figure 3B:
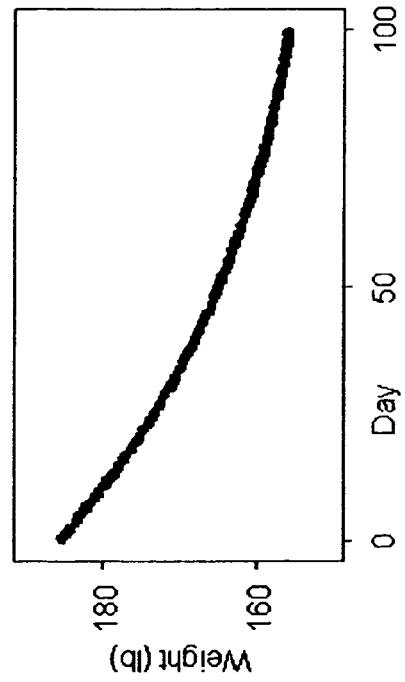
FIG. 3b is a graph showing the same factors as FIG. 3a, over a longer time period. The time covered by the Figure is 100 days.
Figure 3C:
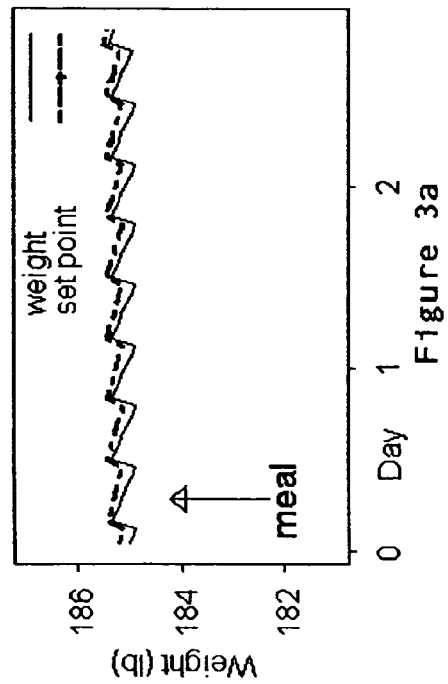
FIG. 3c is a graph showing the results of a computer simulation of the set point and weight for an individual over time. Fructose water is being ingested. The time covered by the Figure is three days.
Figure 3D:
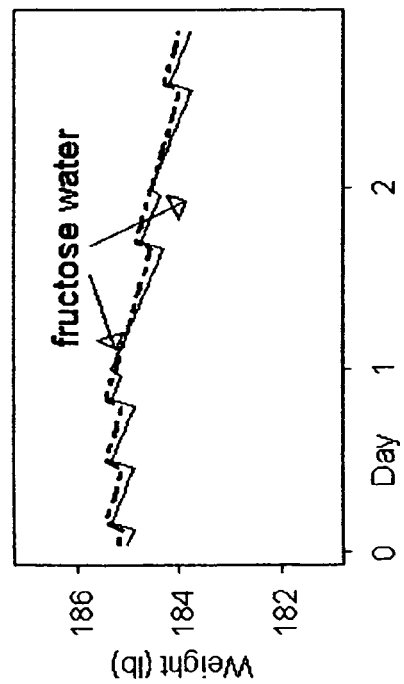
FIG. 3d is a graph showing the same factors as FIG. 3c, over a longer time period. The time covered by the Figure is 100 days.

Caloric source. To use the method of the invention, between meals a person consumes an unflavored caloric source (i.e., a solid or liquid containing a source of calories and not having a strong flavor, other than sweetness or saltiness, as discussed in detail below) containing—over the course of a day—a substantial number of calories substantial percentage of the person's usual daily caloric intake). Typically, at least 10% of the calories consumed in a day will be in the form of the unflavored caloric source, with higher percentages, such 15%. 20%, 25%, 30%, 35%, 40%, or even more being also possible, depending on the rate of desired weight loss and the need to maintain a fully nutritional diet through food consumed during normal meals. Higher percentage consumption of the unflavored caloric source is associated with more rapid weight loss. An initial consumption of 20% (+/−5%) of daily calories in the form of the unflavored caloric source is most preferred, as this amount provides rapid weight loss without requiring consumption of a high amount of unflavored food. The source of calories is readily provided in the form of sugars dissolved in water, and this type of "caloric water" is used as an example throughout the remainder of this discussion, as use of a sugar water is a preferred embodiment of the invention because of the ease of use and low cost of such preparations. It will be recognized, however, that other caloric sources (e.g., carbohydrates of higher molecular weight than simple sugars, as well as proteins and fats) can provide all or part of the calories in the caloric source, provided that the resulting composition lacks flavor to the extent described below. Discussions of use of sugar water in the example below therefore should be considered by the reader to be a specific example of the more general "caloric source" and should not be considered to be limiting of the invention, as a different caloric source could replace the sugar water in any of the examples that are given below. Examples of other caloric sources include but are not limited to solid compositions, suspensions, and solutions containing one or more substance selected from starch, flour, cornmeal, bran, dextran, animal and vegetable protein and hydrolyzed preparations obtained therefrom (including compositions containing only simple amino acids), water and/or oil compositions obtained by pressing plants or plant parts, and residue left after the pressing of plants or plant parts. If a material contains flavor to the extent that the flavor exceeds the "mild" flavor as described herein, it can be used in the practice of the invention if it is diluted or if the flavor is otherwise masked, such as by the addition of a flavor-masking substance.

Contents of sugar water. When a sugar water is used, the sugar water can contain any sugar (fructose, sucrose, glucose, maltose, etc.) that supplies energy that the body can use—that is, contains calories. Here "sugar" preferably means a mono- or disaccharide comprising any of the naturally occurring 5- or 6-carbon sugars. Other sugars could also be used but are less preferred, usually because of nutritional, health, or cost considerations. The sugar water must not contain any substance that produces more than a mild flavor, apart from sweetness or saltiness. More precisely, it cannot contain substances that allow a substantial flavor-calorie association to form. Examples of such forbidden substances are substances that produce fruit flavors, sour tastes, bitter tastes, and combinations of these tastes and flavors. While ordinary non-diet soft drinks (such as Coke) and fruit juices (such as apple juice and orange juice) provide the necessary calories, their flavorings make them unusable in this method and thus makes their use outside the scope of the present invention, as the absence of flavoring (apart from sweetness and saltiness) is crucial. The sugar water can contain palatable amounts of salt. It can also contain substances that produce little or no taste, including vitamins, minerals, protein, fat, and fiber. A common component that may be used in a sugar water composition is a preservative, which typically would comprise a material already approved for use as a preservative by the Food and Drug Administration and listed on the FDA list of "Generally Recognized As Safe" (GRAS) substances.

Mild flavor: A liquid or solid caloric source is considered to have a taste no stronger than "mild" if a panel of 100 adults, selected in such a way to be a representative sample of the United States population over age 18, responds with a median answer of 75 or less (median computed over the 100 subjects) when asked the following question: "Please rate the strength of the taste of this food apart from how sweet and salty it is. In other words, ignore how sweet and salty it is. Taking the average strength of the tastes of the foods you usually eat to be 100 and no taste at all to be zero, the strength of the non-sweet, non-salty taste of this food is what number?" Caloric sources having an even lower median answer, when tested the same way, are preferred. Examples of substances that would be more preferred are those that have median scores of 50 or less, 30 or less, and, most preferably, 10 or less. The present discussion often refers to a caloric source meeting the "mild flavor" limitation stated here as an "unflavored caloric source" to avoid the use of the more awkward phrase "caloric source having no more than a mild flavor."

Concentration of caloric source in a caloric water composition. Any palatable concentration (i.e., that is not too unpleasant to drink) is permitted when a caloric water; such as a sugar water composition, is being prepared. A food, whether a solid food or a liquid, such as a sugar water composition, is considered palatable if 50% or more of a panel of 100 adults, selected in such a way to be a representative sample of the United States population over the age of 18, responds "no"'when allowed to taste the food and is then asked: "Is this food unpleasantly sweet? Please respond 'yes' or 'no.'" Obviously, the, word "sweet" can be replaced with another word, such as "salty," when another factor is being considered. Most generally the question could be as follows: "Is this food too unpleasant to eat?". When a caloric water composition is prepared, the concentration (calories/liter) should be great enough so that the necessary amount of liquid—an amount that supplies the right number of calories per day—is not difficult to drink. A concentration that allows the amount of water drunk daily to be between 0.5 and 2 liters is best. With less than 0.5 liters of liquid, the solution may be unpleasantly sweet. With more than 2 liters of liquid, it may be hard to drink all of it each day.

How much to consume. Over the course of a day, enough of the caloric source must be consumed (always between meals) to supply a substantial number of calories. The greater the percentage of a person's calories derived from the unflavored caloric source, the lower the body weight at which his or her weight will stabilize. Amounts of a caloric source containing 10-40% of a person's average caloric intake are reasonable starting points. For instance, if a person usually consumes about 2000 calories/day, in the beginning the unflavored calorie source should contain 200-800 calories/day. The amount of calories from unflavored, caloric source consumed between meals will eventually have to be adjusted—maybe raised, maybe lowered—to reach and maintain the desired weight. The lower the desired weight that a person wants to maintain, the more calories from the unflavored caloric source he or she will need to ingest between meals.

Timing of ingestion. The unflavored caloric source should be consumed most days. Missing a small percentage of days will not make an important difference. To make up for not consuming the caloric source on one day, it can be consumed the next day. It must be consumed between meals. More specifically, it must be consumed at a sufficient temporal distance from meals to prevent the calories in the unflavored caloric source from becoming associated with the flavors of what is eaten at the meal. One hour before and one hour after a meal is enough distance to fulfill this condition—that is, it is preferred that the unflavored caloric source be consumed no less than one hour after the most recent meal and no less than one hour before the next meal. Shorter or longer times may be more appropriate for individuals with, different tendencies to associate the caloric water with the flavors of the meal. Times less than one-half hour before or after meal times are not likely to be effective. Longer times, such as at least two hours before the following meal and at least two hours after the preceding meal, are also within the scope of the general description of "between meals." Subject to this constraint—must be consumed between meals—the unflavored caloric source can be consumed in amounts of any comfortable size throughout the day.

Duration of ingestion. After losing weight, to maintain the lower weight, the person should continue to drink an unflavored caloric source on most days. In other words, if consumption of the unflavored caloric source stops completely, the person's weight will generally return its original level because of hunger and the resulting increased consumption. However, the amount of unflavored caloric source consumed during the weight-sustaining period can be reduced relative to the amount consumed during the weight-loss period.

Consumption of other food. To lose weight, consumption of other food (other than the unflavored caloric source) must be reduced by more than the amount of calories of caloric source consumed between meals. For instance, if 400 calories of an unflavored caloric source are consumed daily, consumption of other foods must be reduced by more than 400 calories. This will occur naturally as a result of appetite supression, and the normal supression of appetite that occurs with the practice of the invention should not be overcome by forced feeding. Other food should be chosen so that the total diet—unflavored caloric source plus other food—provides healthy amounts of all nutrients. If the unflavored caloric source contains vitamins, minerals, protein, fat, and fiber, this will require no special adjustments. To maintain a lower weight, daily ingestion of calories from other food plus calories from the unflavored caloric source must roughly equal the calories burned daily. A "normal food" or "other food taken at mealtime" is any food taken at mealtime and not subject to the flavor restrictions recited here for the unflavored caloric source. Such a "food" can include bland or other flavors of foods taken at mealtimes (including an unflavored caloric source consumed at mealtime). Use of unflavored caloric sources at mealtimes is not preferred in order that mealtimes can provide the nutrients necessary for a healthy diet.

Meaning of "providing." In its most general applications, the present invention calls for "providing" a caloric source to a human or animal having a mild flavor or less flavor, other than sweetness or saltiness, at a time different from meal time and in an amount sufficient to provide a significant fraction of total daily caloric consumption. In this context "providing" means both (1) that a human or animal, of its own free will, ingests the caloric source in the manner so described or (2) that another entity, typically another human or a surrogate for such a human, such as a hospital, health food store, or corporate supplier of diet products, makes such a caloric source available to the party that ingests the caloric source, whether by co-packaging such a caloric source with instructions to follow the method as described or by otherwise inducing the consuming party to follow the method as described (such as by advertising a caloric source for use with the method of the invention).

Application of invention to non-human animals. As there is a desire of many animal owners to control the weight of their pets or other animals, the invention can also be applied to non-human animals, especially mammals such as dogs and cats, in the same manner as described here for use with humans, but providing drinking water in the form of caloric water as described herein. Other unflavored caloric sources can also be used.

Products of the invention. Unflavored sugar waters, such, as glucose solutions, have been used for other purposes. For example, glucose solutions are often ingested by persons suspected of having diabetes in order to measure the ability of their body to respond the ingestion of glucose. Such materials, made available for purposes other than the present invention and in the absence of instructions to follow the method of the invention, are not considered to be products within the scope of the present invention. However, if previously available caloric sources were to be packaged in association with instruction to follow the method of the invention, such combinations would to be converted into products of the present invention. Non-limiting examples of "association" of instructions with a caloric source include providing instructions on the container of the caloric source itself, providing instructions on an outer container (e.g., printed instruction on a box containing a bottle of a sugar water composition), a package insert in an outer container containing one or more inner containers (e.g., printed instructions on a paper enclosed in a box containing 6 bottles of a sugar water composition), and advertising (e.g., internet, email, other electronic, print, radio, or television ads) specifically referring both to a caloric source appropriate for use with the method of the invention and to the method of the invention itself.

Basics of Invention Theory. The theory builds on an idea familiar to weight-control researchers—that body fat is regulated by a feedback system with a set point (e.g., Keesey & Hirvonen, 1997). According to what is often called the set-point theory of weight control, the body-fat regulatory system resembles a heating system with a thermostat. When the regulated variable is below its set point, countervailing processes begin that tend to raise the regulated variable. A heating system turns heaters on when the temperature is below the set point and turns them off when the temperature is above the set point. Similarly, the weight-regulating system "turns on" hunger and reduces metabolic rate when the amount of body fat is below its set point and "turns off" hunger and returns metabolic rate to normal when the amount of body fat is above the set point. The set point theory of weight control is widely (e.g., Hirsch, Hudgins, Leibel, & Rosenbaum, 1998; Schwartz, Baskin, Kaiyala, & Woods, 1999), if not universally (e.g., Wirtshafter & Davis, 1977), accepted.

Set point theories usually assume the set point is nearly constant from day to day (e.g., Gibbs, 1996, p. 91). The theory of the present invention, however, assumes the set point is always changing, in accord with the following rules:

1. Flavors associated with calories raise the set point. Flavors become associated with calories via Pavlovian conditioning (see below for details). The stronger the flavor-calorie association, the larger the set-point increase.
2. Between meals the set point decreases. The greater its value, the faster it decreases. It decreases more slowly than body fat decreases when a person eats nothing.

FIG. 1 illustrates these rules. Eating a carrot (weak flavor-calorie association) raises the set point less than eating a cookie (strong flavor-calorie association) with the same number of calories. When a person is not eating, the set point falls, although not as fast as the actual amount of body fat.

That flavors become associated with calories is well established; at least in rat experiments (Sclafani, 1991). The associations have been revealed by preference tests. In a typical experiment, on Monday, Wednesday, and Friday, rats were given 30-min access, to cherry-flavored water followed by 10-min access to a solution containing fat. On Tuesday, Wednesday, and Saturday, the rats were given 30-min access to grape-flavored water alone. A week later, given a choice between cherry-flavored water and grape-flavored water, the rats drank more cherry-flavored water. Flavors strongly associated with calories are preferred to flavors less strongly associated.

FIG. 2 illustrates a key idea behind application of this theory: The strength of a flavor-calorie association depends on how much the flavor signal (the neural signal generated by flavors) overlaps the calorie signal (the signal generated by the detection of calories). This is just a particular instance of what is surely true of any Pavlovian association: Its strength depends on the amount of overlap between the neural signal produced by the conditioned stimulus (CS) and the neural signal produced by the unconditioned stimulus (US).

You can lower your set point by not eating, but that is not sustainable. In the long run, you must consume each day roughly the amount of calories that you burn. For sustainable, long-term weight loss, this theory predicts that you must reduce how strongly the flavors of your diet are associated with calories—in other words, reduce the overlap in FIG. 2. This prediction of the theory was supported by my experiments, and this support was one of the main reasons to believe the theory. But FIG. 2 is not central to understanding or predicting the experimental results that led to this filing.

Discussion of Experimental Results

The theory explains the experimental results (see the Example, later in this text) by assuming that sweetness does not increase the set point even when the flavor (sweetness) is repeatedly paired with a source of calories (such as fructose). The fructose water is unflavored—that is, contains nothing besides the fructose—but is obviously sweet. The unflavored nature of the fructose water must be crucial. Fruit juice, which is mainly fructose water plus flavoring agents, is associated with weight gain, not loss. Coca-Cola, which usually contains sucrose and fructose plus flavoring agents, is associated with weight gain, not loss. Although fructose has a clear taste (sweetness), apparently this taste does not become associated with calories.

According to this explanation, then, the fructose water raises body weight (because it contains calories) but does not raise the set point. FIG. 3(a-d) shows how the addition to the diet of something that raises body weight but not the set point can cause a large weight decrease.

It shows the results of two computer simulations—without (FIGS. 3a and 3b) and with (FIGS. 3c and 3d) fructose water. The first graph in each row shows the first few days; the second graph shows more days. The computer model embodies the assumptions of the theory. The set point and body weight are always dropping, except when something is eaten. When the body weight-set point difference reaches a certain threshold, it causes a meal to be eaten (because when body weight is below the set point, a person becomes hungry). An ordinary meal raises both body weight and the set point. Fructose water, however, raises body weight but not the set point. FIG. 3(1-d) shows that—assuming this model is roughly correct—addition of even a small amount of fructose water (or anything which raises body weight but not the set point) to the diet can cause body weight to stabilize at a much lower value.

An explanation in words of the phenomenon shown in FIG. 3(a-d) is as follows: Our weight will stabilize wherever the set point is—if the set point is high, our weight will eventually be high, if our set point is low, our weight will eventually be low. Where the set point ends up is determined by the balance between how far it falls during a day and how much it is pushed up by meals. Suppose, for example, that it falls 2 lb./day and is pushed up 2 lb./day by meals. If a person now gets 20% of their calories from something that does not push the set point up, then the set point will be pushed up only 1.6 lb./day. It will fall to a lower level where it is falling only 1.6 lb./day; recall that the set point falls more slowly the lower it is.

The assumption that sweet tastes do not form flavor-calorie associations makes sense in terms of other knowledge. As a flavor becomes associated with calories it tastes "better"—becomes more preferred. Everyday examples are alcoholic beverages, which taste bad at first but because alcohol contains calories, taste good after repeated ingestion. Most flavors are initially neutral or repulsive. Sweetness, however, is initially attractive. That is, it is attractive the first time you taste it. No learning is required; this is why children like sweets. There is no need for flavor-calorie conditioning to make foods that taste sweet attractive.

Development of Theory: Results from Previous Experiments

Experiment 1: Effect of Processing (Roberts & Neuringer, 1998). Sclafani and Springer (1976) found that adult rats allowed to eat unlimited amounts of "supermarket foods"

(Sclafani & Springer, 1976, p. 461), such as cookies, salami, cheese, banana, and marshmallows, gained considerable weight relative to rats given unlimited lab chow. The supermarket rats gained weight two to three times faster than one would expect from a high-fat diet (A. Sclafani, personal communication, Jul. 2, 1996). Similarly, Cabanac and Rabe (1976) found that adult humans who consumed Renutril (a flavored liquid food; like Metrecal) in place of their regular diet (i.e., as a complete substitute for caloric intake, instead an addition to the regular diet, as in the present invention) lost substantial weight, even though they could consume as much as they wanted.

In 1993, I wanted to lose weight and decided to test this conclusion. I am 5'11" (1.80 m) and at the time weighed 197 pounds (89.4 kg). I reasoned that what makes food tasty is processing (including home processing). Fruit juice tastes better than whole fruit. Cooked food tastes better than raw. So I reduced the amount of processing in my food. I stopped eating deli food, bread, sweets (e.g., scones), fruit juice, and fancy frozen food (e.g. Stouffer's Lean Cuisine), ate less meat and chicken (because meat and chicken are higher on the food chain than fish), and more fruits and vegetables. I ate mostly soups, salads, fish, steamed vegetables, rice, potatoes, and fruit.

Figure 4:
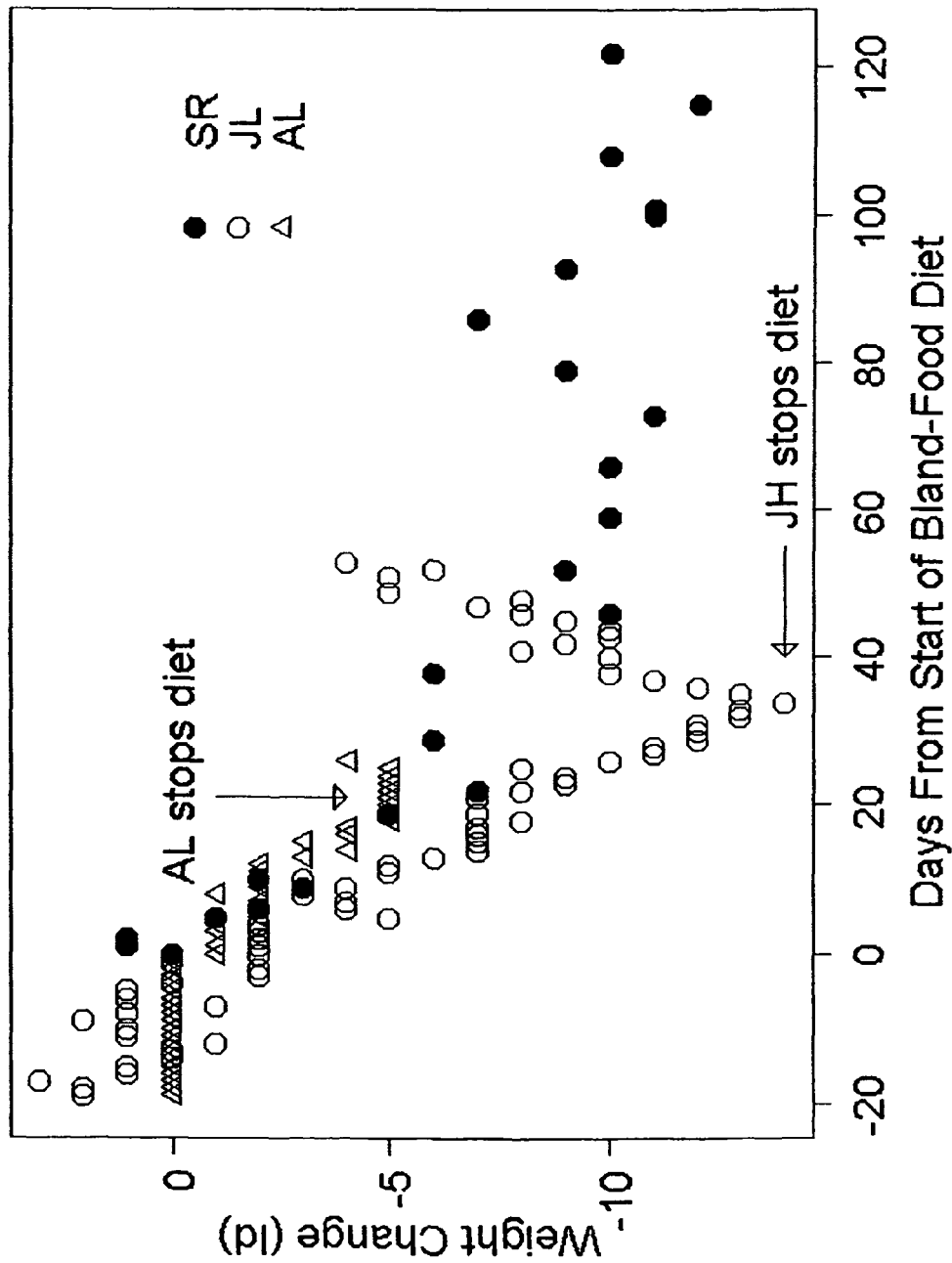
FIG. 4 is a graph showing weight loss produced by a diet of bland food, measured over time for three different subjects.

Over 3 weeks, never going hungry, I lost 11 pounds (5.0 kg), which I never regained. At first the food seemed boring, but after a few days I came to enjoy my new diet and dislike my old one. The time course of my weight change is shown in FIG. 4. Later, two students (JH and AL) tried the same diet. They too lost weight, as shown in FIG. 4, and when they returned to their original diets, they gained weight, providing more evidence that eating less-processed food produces substantial weight loss. Experiments in which subjects changed from a "modern" diet to an "indigenous" one support the same conclusion (O'Dea, 1984; Shintani, Hughes, Beckham, & O'Connor, 1991).

Relevance to invention. This showed that dietary changes can substantially lower weight. The set point must be changeable.

Experiment 2: Effect of Water. An acquaintance told me that when he lived in Japan he began eating a macrobiotic-like diet based on Diamond and Diamond (1985)—lots of fruit, vegetables, brown rice, and water, along with small amounts of fish and chicken. Starting at 86 kg, he lost 20 kg (Tray Critelli, personal communication, Jun. 5, 1996 and Aug. 8, 2000). His final body mass index ($kg/m^2$) was 19.3 (30 or more is obese). At the time my body mass index was 25.8. Except for the water, his diet resembled my diet. Did water make a big difference?

To find out, a few days later I began drinking much more water than usual. Soon I reached 5 liters/day, close to the maximum I could tolerate. I did not measure my prior intake, but it was surely less than 1 liter/day (not counting the water in food).

I was already measuring my weight regularly. I used three scales, to ensure that any weight change was not due to a changing scale.

Figure 5A:
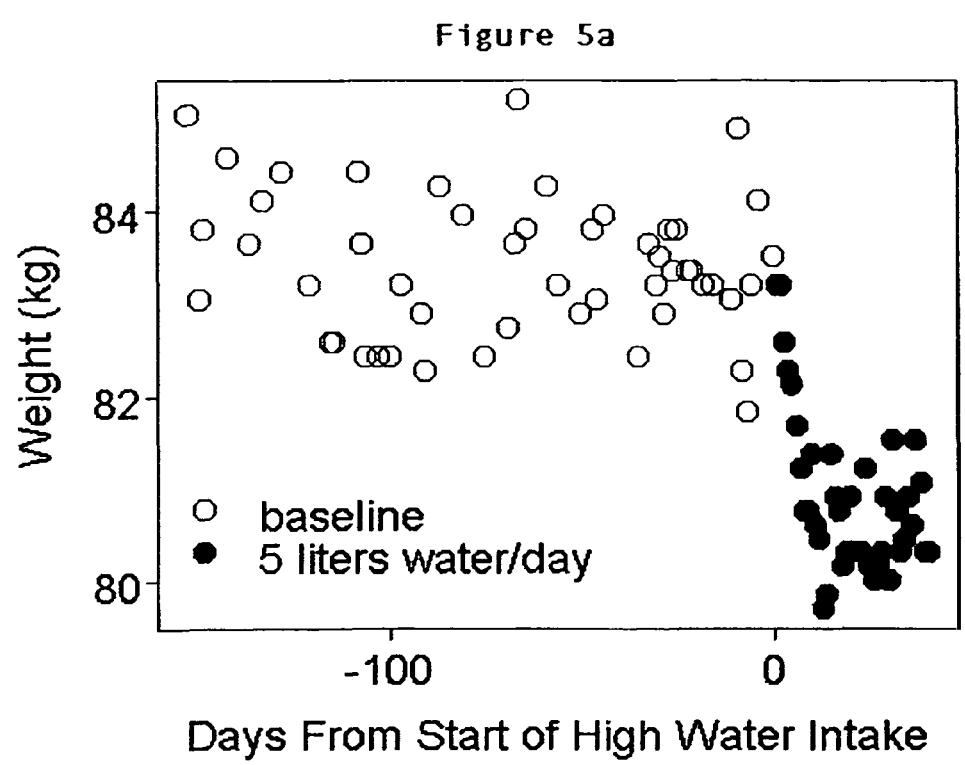
FIG. 5a is a graph showing body weight for a single individual over time. The individual's daily water intake changed from a baseline level to 5 liters at day 0.
Figure 5B:
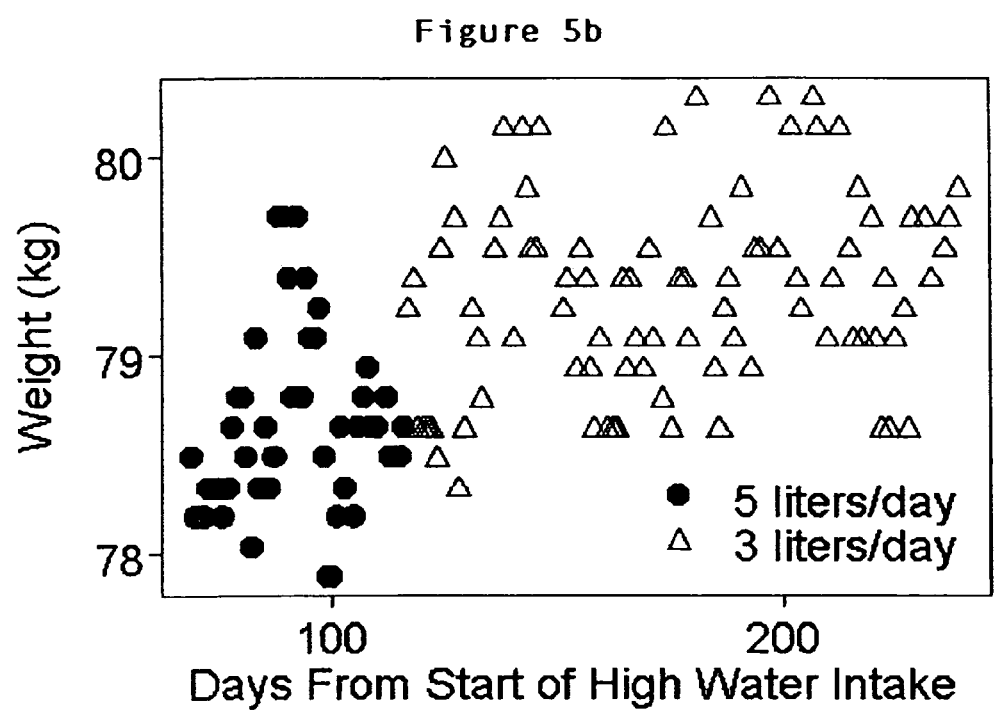
FIG. 5*b* is a graph showing the same factors as FIG. 5*a*, at a later stage. The individual's daily water intake changed from 5 liters to 3 liters at approximately day 120.

FIG. 5(a-b): shows the results. I lost about 2.8 kg over two weeks before my weight stabilized. After four months, tired of drinking so much water, I reduced my intake to 3 liters/day. My weight rose about 0.7 kg. My weight at the end of the 5 liters/day period—about 78.6 kg—was less than my stable weight at in the beginning of the period—80.5 kg—because in the middle of the period I changed my diet (see Experiment 3, below).

Relevance to invention. This was more evidence that the set point is changeable.

Experiment 3: Effect of Low-Glycemic-Index Diet. In 1996 I read Ramirez (1990), which describes a series of experiments with rats about the effect of saccharine on weight. The first experiment found that adding saccharine to a liquid diet caused weight gain. However, the effect—a difference between rats given saccharine and rats not given saccharine—took a week to appear. This implied that learning was involved. Later experiments showed that the effect was eliminated by prior exposure to either the saccharine alone or the liquid diet alone. This suggested that the learning was an instance of Pavlovian conditioning with saccharine as the conditioned stimulus (CS) and the liquid diet as the unconditioned stimulus (US). Many examples of Pavlovian conditioning show a CS pre-exposure effect (exposure to the CS without the US reduces the effect of later CS-US pairings) and a US pre-exposure-effect (exposure to the US without the CS reduces the effect of later CS-US pairings). Because the rats were fed ad libitum, the weight changes implied set point changes.

The Ramirez (1990) results led me to think of the theory described earlier. This theory can explain the fact that reducing processing caused weight loss (Experiment 1) by assuming that processing increases the strength of taste-calorie associations. This assumption made sense. In rat experiments, taste-calorie associations have been detected with preference tests: A taste associated with calories is preferred to a taste not associated with calories. In other words, associating a taste with calories causes it to taste better. My dietary shift to less-processed foods (e.g., from orange juice to oranges) was also a shift to foods that tasted worse—for instance, I preferred the taste of orange juice to the taste of oranges. Many sorts of food processing are choices, chosen because the processed food is preferred to the unprocessed food, usually because it tastes better. Moreover, food processing often (a) increases flavor (e.g., juicing, adding spices, or adding fat) or (b) hastens digestion (e.g., mashing, shredding, or heating). As discussed earlier, these are the two ways to increase the strength of taste-calorie associations.

That the theory could easily explain the effect of processing was encouraging. The effect of processing was quite different than the facts that inspired the theory. Moreover, the effect of processing was large. If the explanation was correct, it implied that changing the strength of taste-calorie associations could have a large effect on the set point—and therefore would-be easy to study experimentally.

What were other ways to reduce the strength of taste-calorie associations? Diabetes researchers had measured glycemic index—a measure of how quickly the food raises blood-glucose level—of many carbohydrate-containing food. The faster rise, the higher the glycemic index. Higher glycemic indexes indicated faster digestion; among foods with the highest glycemic indices are mashed potatoes and bread. It was plausible that a food with a low glycemic index would usually generate a slower calorie signal—and thus a longer CS-US interval—than a food with a high glycemic index. This suggested that eating foods with a lower glycemic index should lower my set point and therefore my weight.

In the United States, easily available foods with a low glycemic index are beans and lentils. So the theory, with additional assumptions, predicted that eating more beans and lentils should cause weight loss. Hearing this prediction, a friend said her boyfriend had been much thinner in high school, when he ate a lot of beans and rice (Joyce Friedlander, personal communication, Aug. 17, 1996).

At the time, my main sources of protein were fish and rice. The next day, I started eating beans and rice instead of fish. I also increased my intake of lentils. FIG. 6 shows the results. I lost weight quickly for a short time—about 3 kg in 20 days, not counting 7 days out of town when I went off of the diet. I had no difficulty following a low-glycemic-index diet and never regained the lost weight.

Relevance to invention. It shows that the theory can be used to find effective means of weight loss. In other words, the theory has predictive power. Because the effect of a low-glycemic-index diet is different than the evidence that led to the theory, it is impressive support for the theory.

Experiment 4: Effect of Thick Pasta. In 1997, examining a list of glycemic indices (Miller, Foster-Powell, & Colagiuri, 1996), I noticed that thinner varieties of pasta had higher values. Capellini (45 on a scale where glucose=100) was more than fettuccine (32). Thin linguine (55) was more than thick linguine (46). This made sense. The thinner the pasta, the more surface area per volume. The more surface area per volume, the faster digestion. Thin pasta cooks faster than thick pasta for essentially the same reason.

This suggested that an especially thick pasta, with a long cooking time, would have an unusually low glycemic index, perhaps lower than lentils (26-30), chickpeas (33), black beans (30), and brown rice (55) that were my main source of carbohydrate at the time and that pasta could easily replace in my diet. Other experiments suggested that eating a lot of it might cause weight loss. At a local store I chose the pasta with the longest cooking time, which was penne regate, with, a suggested cooking time of 13 minutes. Fettuccine had a suggested cooking time of 7 minutes; capellini, 2 minutes.

Figure 7:
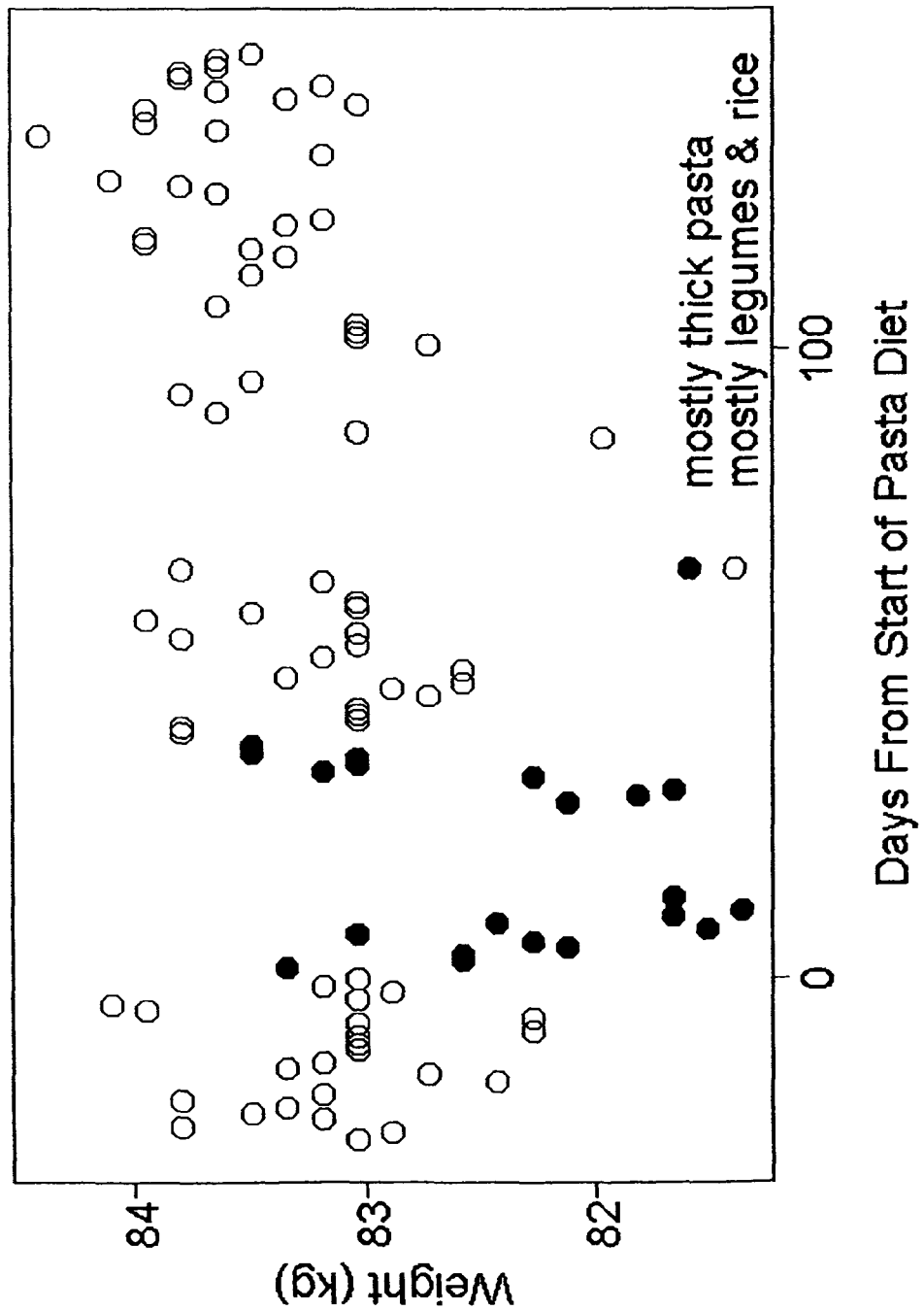
FIG. 7 is a graph showing body weight for a single individual over time. The individual's diet began as mostly legumes and rice, changed to mostly thick pasta, then returned to mostly legumes and rice.

I changed my diet to eat a large amount of penne regate pasta every day—both lunch and dinner. I ate it with store-bought tomato sauces, along with salad. FIG. 7 shows the results. I lost weight quickly at first—about 1.5 kg in 10 days. Then I went out of town for 2 weeks and ate an ordinary range of food during that time. When I returned, my weight was about the same as when I left. I resumed the pasta diet. Contrary to what I wanted to happen, I started gaining weight and in about a week regained the weight I had lost. At this point I returned to my original low glycemic, legumes-and-rice diet.

Relevance to invention. The results show the importance of learning, as the theory, predicts (in contrast to any other weight-control theory). The results also show that expectations and hopes do not have a big effect on the results of my self-experiments. I hoped to lose weight but, eventually, this was not true. After I lost weight I expected to maintain the lower weight (as in FIG. 6)—this did not happen, either. These results therefore help one believe that the rest of the self-experimental results were not distorted by hopes or expectations.

Experiment 5: Effect of Sushi. One afternoon in 1998, at an all-you-can-eat Asian restaurant, I happened to eat a large amount of nigiri sushi (perhaps 20-25 small pieces), along with ordinary amounts of vegetables (string beans, mushrooms) and fruit. I ate the sushi plain—without soy sauce or wasabi. The next day, I was surprised to notice that I wasn't hungry at lunchtime (my first meal of the day). I skipped lunch. I was noticed then that I was not hungry by dinnertime. I ate a small dinner. The next day, I was still much less hungry than usual. Yet every day I was burning lots of calories. My exercise routine, which did not change, was to walk uphill on a treadmill about two hours/day.

I realized that my theory could explain what had happened. The strength of a CS-US association depends on the strength of the CS; the weaker the CS, the weaker the association. In the case of taste-calorie learning, this means that a weaker taste will produce a weaker taste-calorie association. According to my theory, then, food with a relatively weak taste and substantial calories should lower the set point, because calories are ingested with relatively little indication of their presence. Relatively bland (but still flavored) food has produced substantial weight loss in several cases (Cabanac & Rabe, 1976; Herbert, 1962) in which it was a complete replacement of normal food, rather than a supplement. In each case, subjects got all of their calories from a liquid diet and could eat as much as they wanted. But perhaps the weight loss was due to the monotony of the diet rather than its weak taste; this is what Cabanac & Rabe (1976) assumed.

I had not tested the prediction that weakly flavored food produces weight loss because I did not want to eat such food. But sushi was easy to eat. The sushi at the all-you-can-eat restaurants had about half the fish-to-rice ratio as the sushi from ordinary Japanese restaurants but was still good. I continued to eat amounts of sushi, along with vegetables and fruit. Before beginning this diet, I had been eating lots of legumes (with ordinary, amounts of seasoning); rice, vegetables, and fruit (a very low-fat diet), and no more water than needed to avoid thirst.

Figure 8:
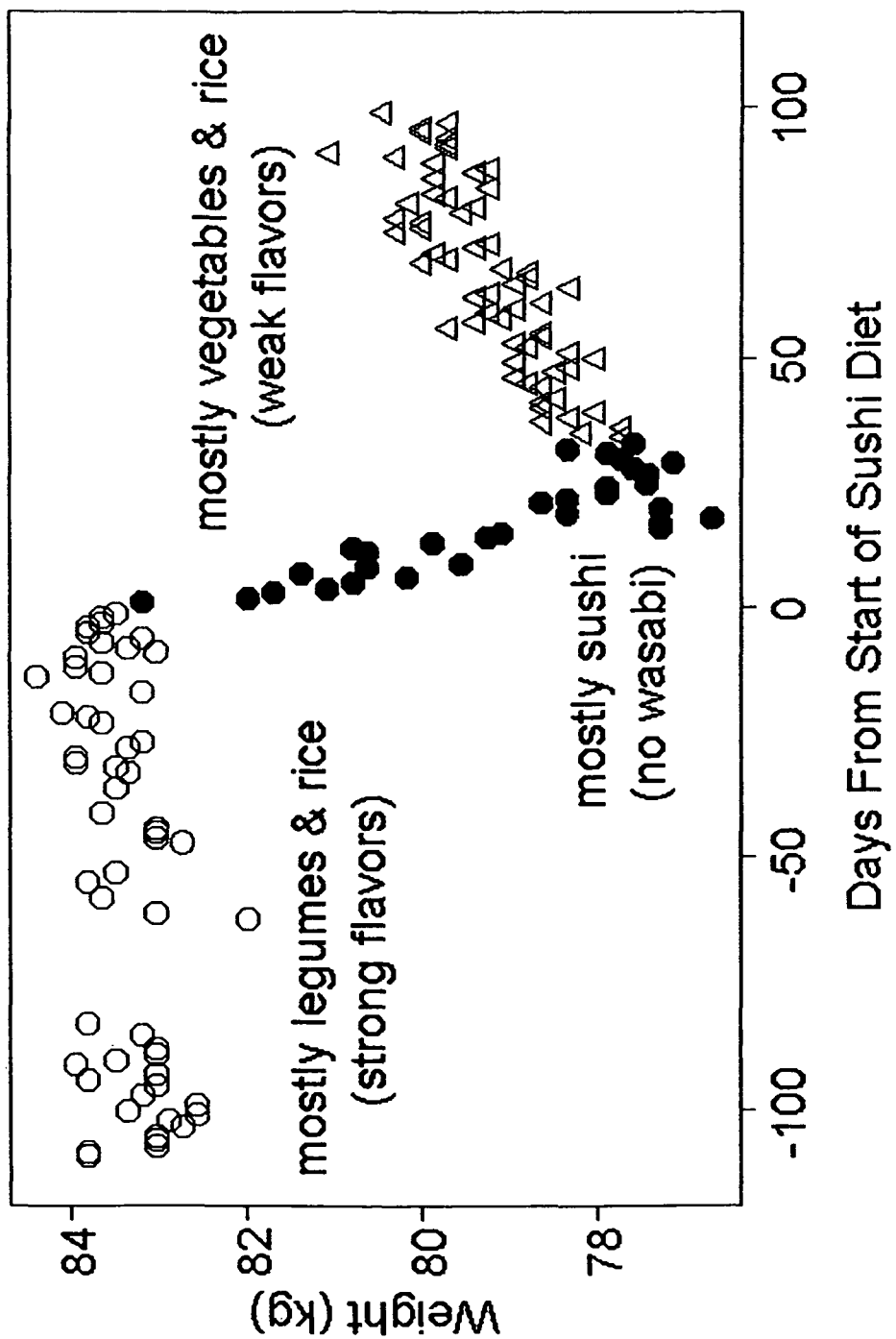
FIG. 8 is a graph showing body weight for a single individual over time. The individual's diet began as mostly legumes and rice, changed to mostly sushi, then shifted to mostly vegetables and rice.

At the start of the sushi diet, I weighed 83 kg; over about 3 weeks, I lost 6 kg (FIG. 8). While the diet was easy to eat, it was expensive and logistically difficult. Moreover, such a narrow diet may not be healthy. So I switched to a diet that emphasized Japanese-style soups (light flavored, lots of vegetables, a small amount of fish or meat) and brown rice. On this diet, which I had hoped would maintain the weight loss, my weight slowly rose.

Relevance to invention. This was strong support for the theory. The weight loss was remarkably large and very hard, perhaps impossible, for most theories of weight control to explain. The weight loss produced by sushi was a striking confirmation of the theory's prediction that weakly flavored food should lower the set point.

Support for Theory: Other Results

The theory is not just supported by data that I have collected. Data collected by others provides support for the background of the invention, such as data collected in relation to set-point theory. Here are some examples.

Set-point theory. A wide range of data, from both humans and rats, supports the idea that human body weight (more precisely, the amount of fat on our bodies) is controlled by a regulatory system with a set point (e.g., Keesey & Hirvonen, 1997).

Evidence for flavor-calorie learning. Many experiments have shown that rats learn to associate the flavor of a food with the calories in the food (Sclafani, 1991).

In addition to these well-known facts, there are several other findings, not so well known, that are hard for conventional weight-control theories to explain.

Ramirez (1990). The subjects were rats fed a liquid diet ad libitum. In a first experiment, rats with saccharin added to their food ate more and gained more weight than rats given the same food without saccharin. The obvious explanation of this result is be that the saccharin made the food more palatable, but other results made it clear that this was wrong, that the explanation was not obvious at all: (a) The effect did not appear immediately. During the first week, the two groups consumed roughly the same number of calories and gained the same amount of weight; only later did they differ. This was observed in two separate experiments. (b) Preexposure of saccharin eliminated the effect. In two experiments, rats given only saccharin to drink for four or more days before the start of the experiment showed no effect of saccharin. One experiment showed that saccharin pre-exposure eliminated the effect at the same time it repeated the original effect (in rats not pre-exposed to saccharin). (c) Pre-exposure of the unsweetened diet eliminated the effect. The unsweetened diet differed considerably from the lab chow the rats had been raised on. Two experiments found that if rats were fed the unsweetened diet for at least one week, later addition of saccharin to that diet did not cause weight gain.

The theory explains these results by assuming that it was the association of the flavor of the saccharin with the calories in the liquid diet that caused the weight gain in the saccharin group. The effect took a week to appear because the association took a week to learn. Pre-exposure of the saccharin eliminated the effect because it eliminated the saccharin-calorie association. Flavor-calorie is an example of Pavlovian conditioning, and many examples of Pavlovian conditioning show the same effect: pre-exposure of the "conditioned stimulus" (here, saccharin) without the "unconditioned stimulus" (here, the liquid diet) reduces the effect of later pairings of the conditioned and unconditioned stimuli. Similarly for the effect of pre-exposure of the liquid diet: With many examples of Pavlovian conditioning it has been observed that pre-exposure of the unconditioned stimulus without the conditioned stimulus reduces the effect of later pairings of the conditioned and unconditioned stimuli Overweight produced by an unpreferred diet (Ramirez, 1988). In an experiment with rats, adding sucrose octaacetate—an extremely bitter-tasting substance—to liquid food caused the rats to eat more of the flavored liquid food than unflavored solid food, even though the rats initially preferred the plain solid food. The rats could eat as much as they wanted. The rats eating the flavored liquid food also gained more weight than the rats eating the unflavored solid food. The theory explains this result by assuming that the flavor provided by sucrose octaacetate formed an association with the calories provided by the food. After this association was learned, it raise the set point, causing the rats to eat more and gain more weight.

Adding water to lab chow increases weight (e.g., Ramirez, 1987). Comparisons of rats given wet and dry chow—otherwise identical—has showed many times that the rats given the wet chow eat more and gain more weight. The theory explains this difference by assuming that adding water to the chow causes it to be digested more quickly. This brings the calorie signal closer in time to the flavor signal, thus increasing the strength of their association. The stronger association raises the set point.

The effect of a supermarket diet takes a week to begin. Sclafani and Springer (1976) found that rats given access to "supermarket food" (such as cookies and salami) in addition to lab chow gained much more weight than rats given only lab chow. However, the difference took one week to appear. The theory explains the delay by assuming that the supermarket food produced stronger flavor-calorie associations than the lab chow; but these associations took one week to form.

Bland food. Eating relatively bland food as the sole source of nutrition causes weight loss (Cabanac & Rabe, 1976; Herbert, 1962), as discussed in relation to my sushi experiment. The theory explains this by assuming that bland food produces a weak conditioned stimulus, and therefore a weak flavor-calorie association.

Absence of taste (Fantino, 1976). An extreme case of "bland food" is the work of Fantino (1976), whose subjects ingested all of their food through a tube through their nose to their stomach—thus ingesting calories with no flavor. Subjects, who could eat as much as they wanted, lost about 10% of their initial weight in 16-18 days. The explanation, according to this theory, is that in the absence of any taste, their set point fell a considerable distance.

Figure 9:
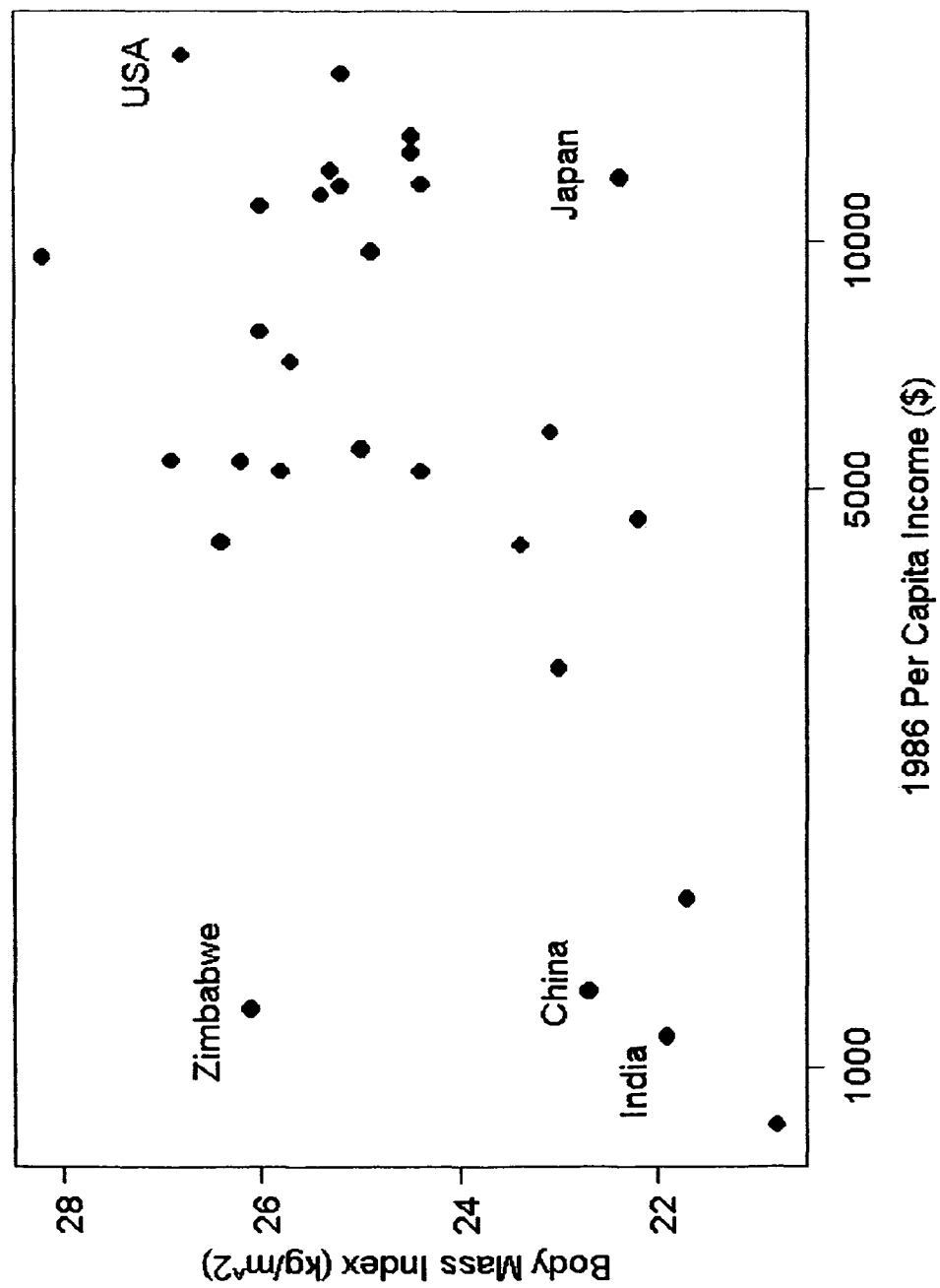
FIG. 9 is a plot of body mass index against per capita income in 1986, for several countries around the world.

Correlation between wealth and weight. FIG. 9 shows the, body mass indexes (Intersalt Cooperative Research Group, 1988) and per capita incomes in 1986 for several countries. With a few exceptions, wealthier nations have greater body mass indexes. The rich-poor difference in body mass index is much too large to be explained by differences in fat intake or activity level. The theory explains it by assuming that food with stronger flavor-calorie associations tastes better—a plausible assumption given that these associations have been revealed by preference tests—and that people in rich countries have more choice of food than people in poor countries. They tend to choose the foods with the stronger flavor-calorie associations, thus raising the set point.

The Japanese exception. Japan is an obviously outlier in FIG. 9—the Japanese body mass index is low given the Japanese income. The theory explains this by assuming that the Japanese diet is relatively bland (as in fact it is)—thus flavor-taste associations are relatively weak. The fact that the Japanese diet is quite salty suggests that saltiness does not raise the set point.

Correlation of weight and fiber (Ludwig et al., 1999). As mentioned earlier, a large survey found that people who ate a lot of fiber (highest quintile of fiber intake) weighed about 8 lb. less than people who ate little fiber (lowest quintile of fiber intake). Fiber intake and glycemic index is closely connected—foods with more fiber have lower glycemic indices. The theory explains the correlation between weight and fiber intake by assuming that foods with more fiber are digested more slowly. Thus the calorie signal that these foods generate—the unconditioned stimulus—is further separated in time from the flavor signal—the conditioned stimulus—that they generate.

Best Mode to Practice the Method of the Invention

To lose weight, the person should drink one liter of unflavored fructose water each day between meals (at least one hour before or after any meal) while eating a total (including the fructose water) of about 50% of their usual caloric intake. In addition, they should make sure that the entire diet (fructose water plus ordinary food) contains adequate protein, fat, vitamins, minerals, and fiber. The fructose water initially should provide about 20% of the person's usual caloric intake. If this does not produce enough weight loss easily, the amount of calories in the fructose water should be increased.

When the desired weight is reached, total caloric intake must be increased, probably back to its pre-weight-loss level, to prevent further weight loss. To maintain the lower weight, the person must continue to drink the unflavored fructose water between meals. The amount of daily calories from the unflavored fructose water will probably need to be adjusted, either up or down, to comfortably maintain the lower weight.

The concentration of the fructose water should be such as to give the right amount of calories in one liter because it is easy and healthy (Kleiner, 1999) to drink one liter of liquid per day. Vitamins, minerals, protein, fat, and fiber should be added so long as the additions do not cause the solution to have a strong taste (with the exception of saltiness—a salty taste is okay). They should be added in quantities that produce nutritional balance—healthy amounts of vitamins, minerals, protein, fat, and fiber—when the rest of the daily diet is taken into account.

Possible Modifications and Variations on the Best Mode

1. Any sugar (sucrose, glucose, fructose, maltose, etc.) or mixture of sugars can be used, so long as it is a source of calories (i.e., digestible) and provides no strong flavor other than sweetness. Fructose is probably best because of its low glycemic index and its long history as part of the human diet, but it is possible that other sugars will have certain advantages.

2. Any source of calories—not just sugars, and not just liquids—with no strong flavor apart from sweetness and saltiness can be used. It might be possible to make candy-bar-like or protein-bar-like foods that have the same effect. These bars would have (a) plenty of calories, (b) a sweet taste, (c) possibly a salty taste, and (c) no other flavor. Currently available candy bars and protein bars would not work because they have flavors other than sweetness and saltiness. Eating such bars might be more convenient than drinking liquid.

Advantages and Improvements over Existing Practice and Features Believed to be New The main advantage of the new method is how easily can be used to lose a large amount of weight. It is easy in several ways:

1. Comfortable. No hunger is involved. In contrast, caloric restriction eventually produces great and unremitting hunger.

2. Safe. When fructose is the sugar used, the method uses only substances (water and fructose, and possibly vitamins, minerals, protein, fat, and fiber) that have been part of the human diet for a very long time—probably hundreds of thousands of years. This implies that long-term ingestion is probably very safe. By comparison, drugs and surgery are dangerous.

3. Powerful. In 4 weeks, I lost 19 pounds using the method. And 19 pounds is not the upper limit.

4. Convenient. In contrast to the methods advocated by almost all recent diet books, the person using the method can continue to eat whatever he or she usually eats—just less of it No foods need to avoided. Any meal can be eaten in full (so long as the person eats less at other meals).

5. Inexpensive. Purchased in bulk, a pound of crystalline fructose costs about $0.80 (eighty cents). It contains about 3300 calories—more than a day's intake for most people. Other foods advocated for losing weight, such protein, usually cost much more for the same number of calories.

6. Fast. Using the method, I lost weight at a rate of about 4 lb./week, and even faster rates may be possible. In contrast, exercise programs designed for weight loss produce weight loss at a rate of 0.5 lb./week or less (Epstein & Wing, 1980).

According to conventional ideas about weight control, the method makes no sense whatsoever. Sugar drinks, such as soft drinks (e.g., Coke, Seven-Up) and fruit juice, are usually seen as bad for losing weight—something to be avoided. Indeed, they are, according to my theory, because conventional sugar drinks are always flavored. The idea that the drink must be unflavored apart from sweetness and saltiness has no precedent.

Example of Method of the Invention

Procedure. To test the theory that consuming calories not associated with flavor would result in weight loss, when used to replace calories that were associated with flavor, I weighed myself every day to establish a baseline. I had three scales, each of which could be read to the nearest pound; I took the average of the three weights. I already had weight records from months before the trip but more recent measurements were needed. On day one of the experiment, I started the experimental treatment, drinking each day water containing a substantial amount of fructose. During the experiment I reduced the amount of fructose I drank each day and did not drink the fructose on some days as it became clear how powerful the treatment was—how completely it had abolished my appetite. The following Table 1 shows the amount of fructose (in terms of calories) and water each day.

TABLE 1

| date | fructose (calories) | water (liters) | notes |
| --- | --- | --- | --- |
| 1 | 1000 | 2 | |
| 2 | 0 | 0 | 1000 calories too powerful |
| 3-10 | 500 | 2 | |
| 11-13 | 0 | 0 | to lose weight more quickly |
| 14-15 | 500 | 2 | |
| 16 | 250 | 1 | out of town |
| 17-20 | 0 | 0 | out of town, to lose weight more quickly |
| 21 | 250 | 1 | dose reduced to 250 calories/day because 500 calories/day too powerful |

Results. The fructose water almost completely eliminated my appetite. I was almost never hungry but ate anyway—much less than usual—for social reasons and to prevent malnutrition. I rapidly lost weight. FIG. 10 (a graph) shows how my weight changed, as well as fructose consumption. Data collected included daily weight, sleep, fructose water consumption, hunger, ordinary food consumption, and daily activity. As shown in FIG. 10, my weight loss was significant and immediate during the weight-loss portion of the diet, the diet allowed me to gain weight by deliberately changing consumption patterns, and the diet provided for extended weight maintenance at a lower weight than that which existed prior to going on the diet of the invention.

References

Cabanac, M., & Rabe, E. F. (1976). Influence of a monotonous food on body weight regulation in humans. *Physiology & Behavior*, 17, 675-678.

Diamond, H., & Diamond, M. (1985). *Fit for life*. New York: Warner Books.

Epstein, L. H., & Wing, R. R. (1980). Aerobic exercise and weight. *Addictive Behavior*, 5, 371-388.

Fantino, M. (1976). Effet de l'alimentation intra-gastrique au long tours chez l'Homme. *Journal de physiologie*, 72, 86A.

Gibbs, W. W. (1996, August). Gaining on fat. *Scientific American*, 275, 88-94.

Herbert, V. (1962). Experimental nutritional folate deficiency in man. *Transactions of the Association of American Physicians*, 73, 307-320.

Hirsch, J., Hudgins, L. C, Leibel, R. L., & Rosenbaum, M. (1998). Diet composition and energy balance in humans. *American Journal of Clinical Nutrition*, 67, 551S-555S.

Intersalt Cooperative Research Group (1988). Intersalt: An international study of electrolyte excretion and blood pressure. Results for 24-hour urinary sodium and potassium excretion. *BMJ*, 297, 319-328.

Keesey, R. E., & Hirvonen, M. D. (1997). Body weight set-points: Determination and adjustment. *Journal of Nutrition*, 127, 1875S-1883S.

Kleiner, S. M. (1999). Water: An essential but overlooked nutrient. *Journal of the American Dietetic Association*, 99, 200-206.

Ludwig, D. S., Pereira, M. A., Kroenke, C. H., Hilner, J. E., Van Horn, L., Slattery, M. L., & Jacobs, D. R., Jr. (1999). Dietary fiber, weight gain, and cardiovascular disease risk factors in young adults. *Journal of the American Medical Association*, 282, 1539-1546.

Miller, J. B., Foster-Powell, K., & Colagiuri, S. (1996). *The G.I. factor*. Rydlamere, Australia: Hodder & Stoughton.

Montignac, M. (1999). *Eat yourself slim*. Baltimore, Md.: Erica House.

O'Dea, K. (1984). Marked improvement in carbohydrate and lipid metabolism in diabetic Australian aborigines after temporary reversion to traditional lifestyle. *Diabetes*, 33, 596-603.

Ramirez, I. (1987). Feeding a liquid diet increases energy intake, weight gain and body fat in rats. *Journal of Nutrition*, 117, 2127-2134.

Ramirez, I. (1988). Overeating, overweight and obesity induced by an unpreferred diet. *Physiology & Behavior*, 43, 501-506.

Ramirez, I. (1990). Stimulation of energy intake and growth by saccharin in rats. *Journal of Nutrition*, 120, 123-133.

Roberts, S., & Neuringer, A. (1998). Self-experimentation. In K. A. Lattal & M. Perrone (Eds.), *Handbook of research methods in human operant behavior* (pp. 619-655). New York: Plenum.

Schwartz, M. W., Baskin, D. G., Kaiyala, K. J., & Woods, S. C. (1999). Model for the regulation of energy balance and adiposity by the central nervous system. *American Journal of Clinical Nutrition*, 69, 584-596.

Sclafani, A. (1991). Conditioned food preferences. *Bulletin of the Psychonomic Society*, 29, 256-260.

Sclafani, A., & Springer, D. (1976). Dietary obesity in adult rats: Similarities to hypothalamic and human obesity syndromes. Physiology & Behavior, 17, 461-471.

Sears, B. (1995). *The zone*. New York: HarperCollins.

Shintani, T. T., Hughes, C. K., Beckham, S., & O'Connor, H. K. (1991). Obesity and cardiovascular risk intervention through the ab libitum feeding of traditional Hawaiian diet. *American Journal of Clinical Nutrition*, 53, 1647S-1651S.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

I claim:

1. A method for controlling an individual's daily caloric intake, comprising: orally administering a caloric source to the individual at times between the individual's meal times; in which the caloric source includes an oil composition obtained by pressing plants, plant parts, or residue left after the pressing of plants or plant parts, and in which no portion of any caloric source administered to the individual between the individual's meal times, if flavored, has any fruit flavor or any flavor other than one or more of sweet, salty and mild; wherein the caloric source is administered in an amount sufficient to provide a significant fraction of the individual's total daily caloric consumption; and wherein the fraction is at least 35%.

2. A method for controlling an individual's daily caloric intake, comprising: orally administering a caloric source to the individual at times between the individual's meal times; in which the caloric source includes an oil composition obtained by pressing plants, plant parts, or residue left after the pressing of plants or plant parts, and in which no portion of any caloric source administered to the individual between the individual's meal times, if flavored, has any fruit flavor or any flavor other than one or more of sweet, salty and mild; wherein the caloric source is administered in an amount sufficient to provide a significant fraction of the individual's total daily caloric consumption, and wherein the fraction is at least 40%.

* * * * *